(12) United States Patent
Vogt

(10) Patent No.: US 6,609,601 B2
(45) Date of Patent: Aug. 26, 2003

(54) FRICTION CLUTCH

(75) Inventor: Sebastian Vogt, Bad Neustadt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/991,505

(22) Filed: Nov. 6, 2001

(65) Prior Publication Data

US 2002/0070090 A1 Jun. 13, 2002

(30) Foreign Application Priority Data

Dec. 8, 2000 (DE) .......................... 100 61 460

(51) Int. Cl.⁷ .............................................. F16D 13/70
(52) U.S. Cl. ................... 192/70.19; 192/70.27; 192/89.23
(58) Field of Search .................. 192/70.19, 70.12, 192/70.27, 89.23, 113.24

(56) References Cited

U.S. PATENT DOCUMENTS

| | | | | |
|---|---|---|---|---|
| 1,742,805 A | * | 1/1930 | Carhart | 192/70.12 |
| 4,333,554 A | * | 6/1982 | Sink et al. | 192/70.19 |
| 5,181,594 A | * | 1/1993 | Nash | 192/70.27 |
| 5,779,018 A | | 7/1998 | Hofmann et al. | 192/70.14 |
| 5,878,857 A | * | 3/1999 | Fukuda et al. | 192/70.27 |
| 5,950,786 A | * | 9/1999 | Mahoney | 192/70.19 |
| 5,960,921 A | * | 10/1999 | Hofmann et al. | 192/70.27 |
| 6,035,986 A | * | 3/2000 | Hofmann et al. | 192/70.12 |
| 6,276,505 B1 | * | 8/2001 | Hofmann et al. | 192/70.27 |
| 6,409,002 B1 | * | 6/2002 | Orlamunder et al. | 192/70.17 |

FOREIGN PATENT DOCUMENTS

| | | | | |
|---|---|---|---|---|
| JP | 4-272516 | * | 9/1992 | 192/70.19 |

* cited by examiner

Primary Examiner—Richard M. Lorence
(74) Attorney, Agent, or Firm—Cohen, Pontani, Lieberman & Pavane

(57) ABSTRACT

Friction clutch for use in the drive train of a motor vehicle with an input part, a clutch housing, at least one clutch disk in working connection with a takeoff element, and a pressure plate working together with the input part, the force of a stored-energy element acting on the pressure plate to transmit torque to the clutch disk. The radially outer area of the input part has axially oriented walls extending along at least part of the circumference to cooperate with the pressure plate.

18 Claims, 5 Drawing Sheets

FRICTION CLUTCH

BACKGROUND OF THE INVENTION

1. Field of the Invention

The present invention pertains to a friction clutch for use in the drive train of a motor vehicle with an input part, a clutch housing, at least one clutch disk in working connection with a takeoff element, and a pressure plate working together with the input part, the force of a stored-energy device acting on the pressure plate to transmit torque to the clutch disk.

2. Description of the Related Art

U.S. Pat. No. 5,779,018 discloses a multi-disk friction clutch in which the several clutch disks are designed in the form of a set of plates connected to a common hub part. In the clutch housing, a pressure plate is provided, which can be acted upon by a stored-energy device, and in addition several intermediate disks are connected nonrotatably to the clutch housing, these intermediate disks engaging between the plates. By means of the stored-energy device, the intermediate disks and the plates can be pressed against each other to generate mutual frictional contact. The stored-energy device, which here has the form of a diaphragm spring, is situated inside the housing and is essentially parallel the bottom of the housing so that one side of it can be supported against the housing, while the other side is in contact with the pressure plate and can thus exert the required force.

In a friction clutch of this type, there is the problem that the supply of cooling air to the interior of the clutch is limited. This means that the clutch can overheat at least when it is slipping for an extended period of time.

This known friction clutch also suffers from the problem that the housing is manufactured by means of complicated, multi-stage processes.

SUMMARY OF THE INVENTION

It is the task of the present invention to provide a friction clutch in which the flow of cooling air to the components which become heated during operation is improved, and the individual parts of which can also be produced at low cost.

According to the invention, the radially outer area of the input part has walls extending in the axial direction to cooperate with the pressure plate, these walls extending around at least a portion of the circumference.

It is also proposed that the walls for the friction clutch according to the invention be designed with graduations in the circumferential direction.

As a result of this measure, it becomes less expensive to fabricate the friction clutch, especially when castings are used, and fewer work steps are required to assemble it.

It can be provided, for example, that the axially oriented walls have attachment sections, which can be used to fasten the walls to the housing. The housing can also be connected to the wall by fastening means such as screws or bolts. As a result, it becomes very easy to assemble the friction clutch. The friction clutch, especially the input part with the housing, also becomes stiffened when the housing is supported primarily on the axially oriented walls, and the two components are centered with respect to each other in a relatively low-cost manner. The mass moment of inertia is also considerably reduced when at least a certain area of the axially oriented part of the wall has sections of different axial length.

In a concrete embodiment of the invention, it is preferable for each wall to have an attachment section near the base of the input part to cooperate with a fastening means. In addition, an area where the fastening means is subjected to an elastic load is provided next to the attachment section in the axial direction. This makes it possible, first, to increase the stiffness of the input part with respect to the shrouding and, second, to minimize the effects of centrifugal force on the axial wall. This is because the attachment section reduces the bending stresses which occur in the base area of the axial wall as a result of centrifugal force; at the same time, if a certain part of the fastening means is free to be elastically deformed, the fastening means can be preloaded in a controlled manner. To keep down costs and to minimize the amount of work required to manufacture the input part, it is also proposed that the area where the fastening means is deformed be provided in the wall. While elastic load is being exerted on the fastening means, furthermore, the housing will also be elastically deformed in the attachment area. By designing the area of the housing near the fastening means and the area of the housing where it makes contact with the input part in such a way that the housing is elastically deformed at least in the axial direction, it is possible to increase even more the reliability of the assembly process and to reduce the error rate with respect to defective connections. For this purpose, either the housing can have a bulge pointing away from the fastening direction in the contact area with the fastening means, or alternatively the input part can have a depression in this area. The housing is preferably supported in this case against the end surface of the part of the wall extending in the axial direction; there can be one of these end surfaces at each circumferential end of each attachment area.

To obtain the rotating coupling between the input part and the pressure plate, several separate guide surfaces facing in the circumferential direction are provided on the axial walls of the input part, and the axially oriented walls extend around at least part of the circumference of the input part. The guide surfaces are thus able to enter into a working connection with the pressure plate. As a result of this design, the axially oriented walls are made stronger, and the number of different parts required to assemble the friction clutch is reduced to a minimum.

The pressure plate has radial projections to engage with the walls, as a result of which the torque can be transmitted from the input part to the pressure plate; in addition, the pressure plate is free to move axially with respect to the input part.

So that the greatest possible amount of power and high torque can be transmitted via the friction clutch, it is proposed that an additional clutch disk and an intermediate disk be provided, the intermediate disk being provided with radial projections to engage with the axial walls of the input part.

The friction clutch will operate especially advantageously during the engagement and disengagement processes if the pressure plate or the intermediate disk has first radial projections primarily for transmitting torque in the engaged state and second radial projections for guiding the pressure plate or intermediate disk during the engagement process. Both the pressure plate and the intermediate disk can have these projections, in which case the corresponding first and second projections on the pressure plate are preferably designed to be congruent with those on the intermediate disk.

To reduce the stresses resulting from centrifugal forces, the housing can have an outer area which works together with centering sections of the walls. This is also an especially simple way of centering the housing and the input part with respect to each other and their common axis of rotation.

The structure of the input part can be adapted to the transmission of high torques by providing several sections arranged in succession around the circumference of the input part, each one comprising a wall extending in the axial direction, and by removing material from the sections between the sides facing in the circumferential direction to reduce the centrifugal forces. The input part can be manufactured very cheaply especially when the area of removed material is present at least at the end of the axial wall facing the housing. This makes it easy to machine the casting to its final shape after solidification.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
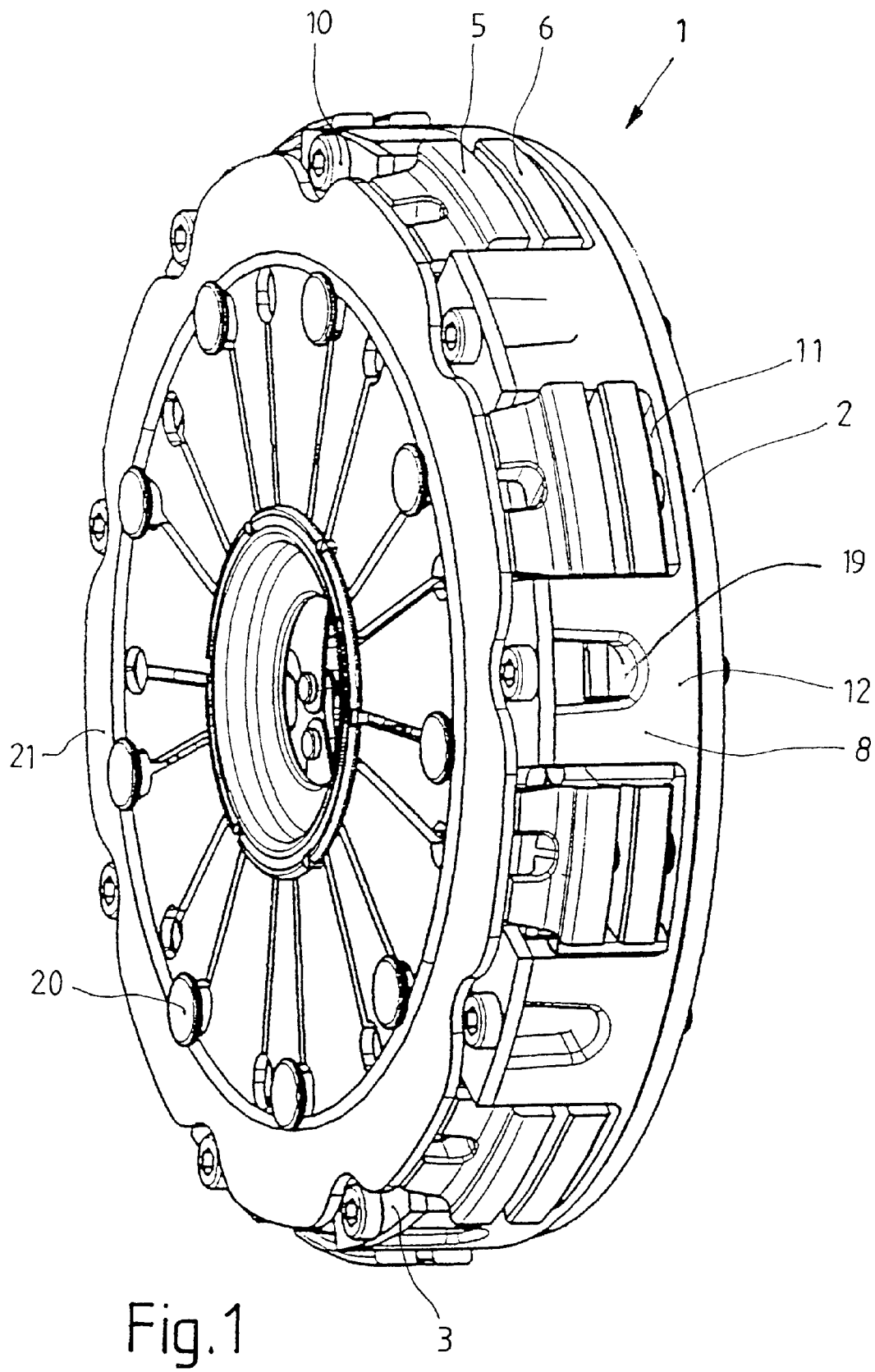
FIG. 1 shows a friction clutch in perspective.

The friction clutch 1 shown in perspective in FIG. 1 consists primarily of an input part 2, which is flanged to the crankshaft of an internal combustion engine; a housing 3, which is attached to the end surface of the input part; and a stored energy element in the form of diaphragm spring 21, which is supported against the axial side of the housing by spacer bolts 20 so that the spring is free to move back and forth. This diaphragm spring 21 acts on knife edges formed on the pressure plate 5 and thus presses the plate in the engaged state against the clutch disk. With respect to its design and function, the friction clutch 1 shown here corresponds for the most part to the friction clutch described in U.S. Pat. No. 6,409,002, the content of which is incorporated herein by reference.

Figure 3:
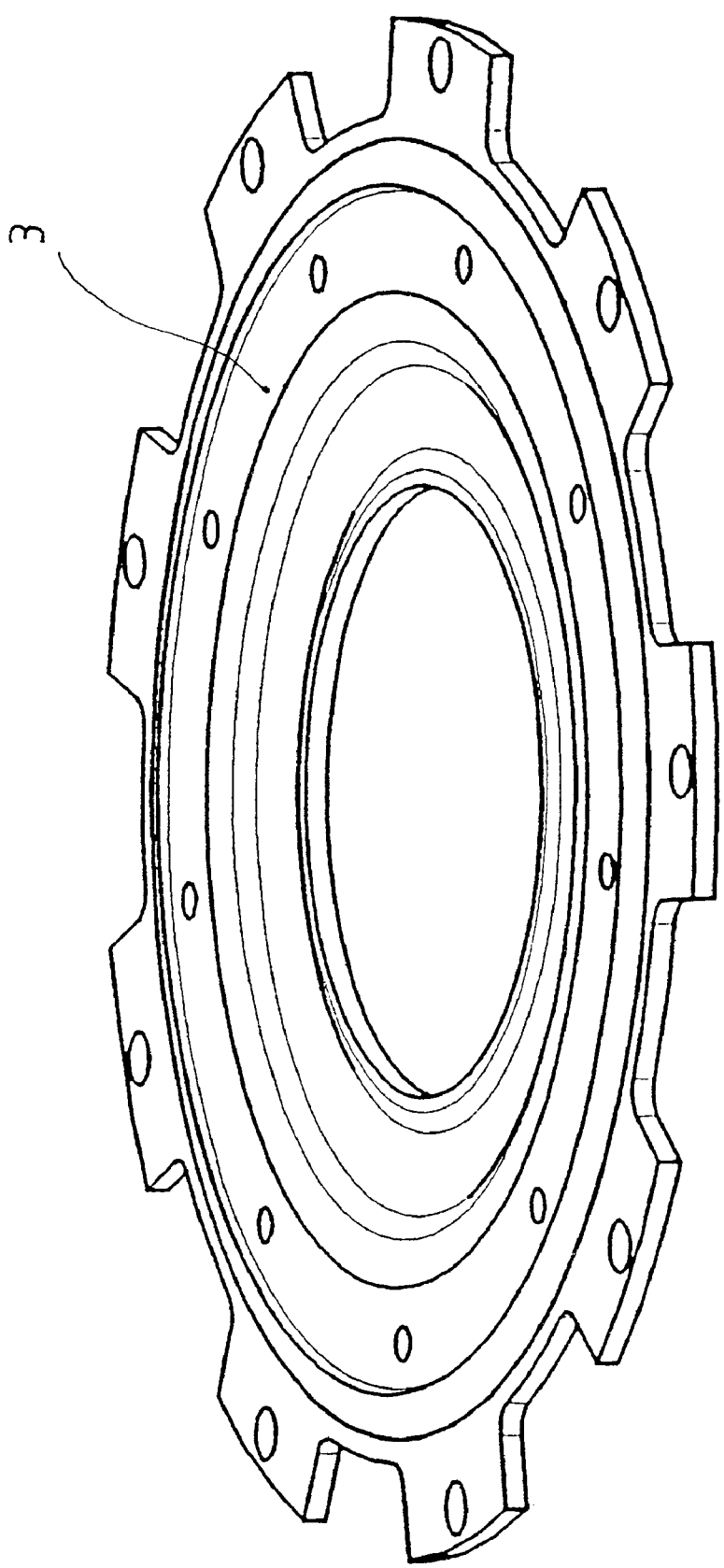
FIG. 3 shows a corresponding housing.

The housing 3 shown in FIG. 3 is connected to the input part 2 by fastening means, which are designed here as screws 10. These screws pass through attachment holes in the radially outer tabs of the housing 3, and their threaded sections engage in the attachment sections 12 of the input part 2. For this purpose, these attachment sections 12 are provided with threads complementary to those of the screws 10. In the area in which the housing 3 rests against the input part 2, an elastic deformation develops as a result of the preload opening 19 in the input part 2 under the area of the housing 3 which is under the contact area of the head of the screw. Adjoining the preload opening 19 in the axial direction is an area where the screw 10 is stretched elastically and is not in either frictional or form-locking connection with the input part 2 before the screw engages with the attachment section. The input part 2 has several axially oriented walls 8 distributed around the circumference on the side facing the housing 3, these walls being designed so that the first radial projections 16 and the second radial projections 17 of the pressure plate 5 (FIG. 5) or of the intermediate plate 6 can engage with them. Thus the first radial projections 16 have the job of transmitting torque from the input part 2 to the pressure plate 5 or to intermediate disk 6, whereas the second radial projections 17 have the job of providing guidance in the axial direction during the engagement and release processes. For this purpose, as disclosed in the application cited above, so-called "elastic sliding elements" are used between the second radial projections 17 and the guide surfaces 15 of the input part 2.

Figure 2:
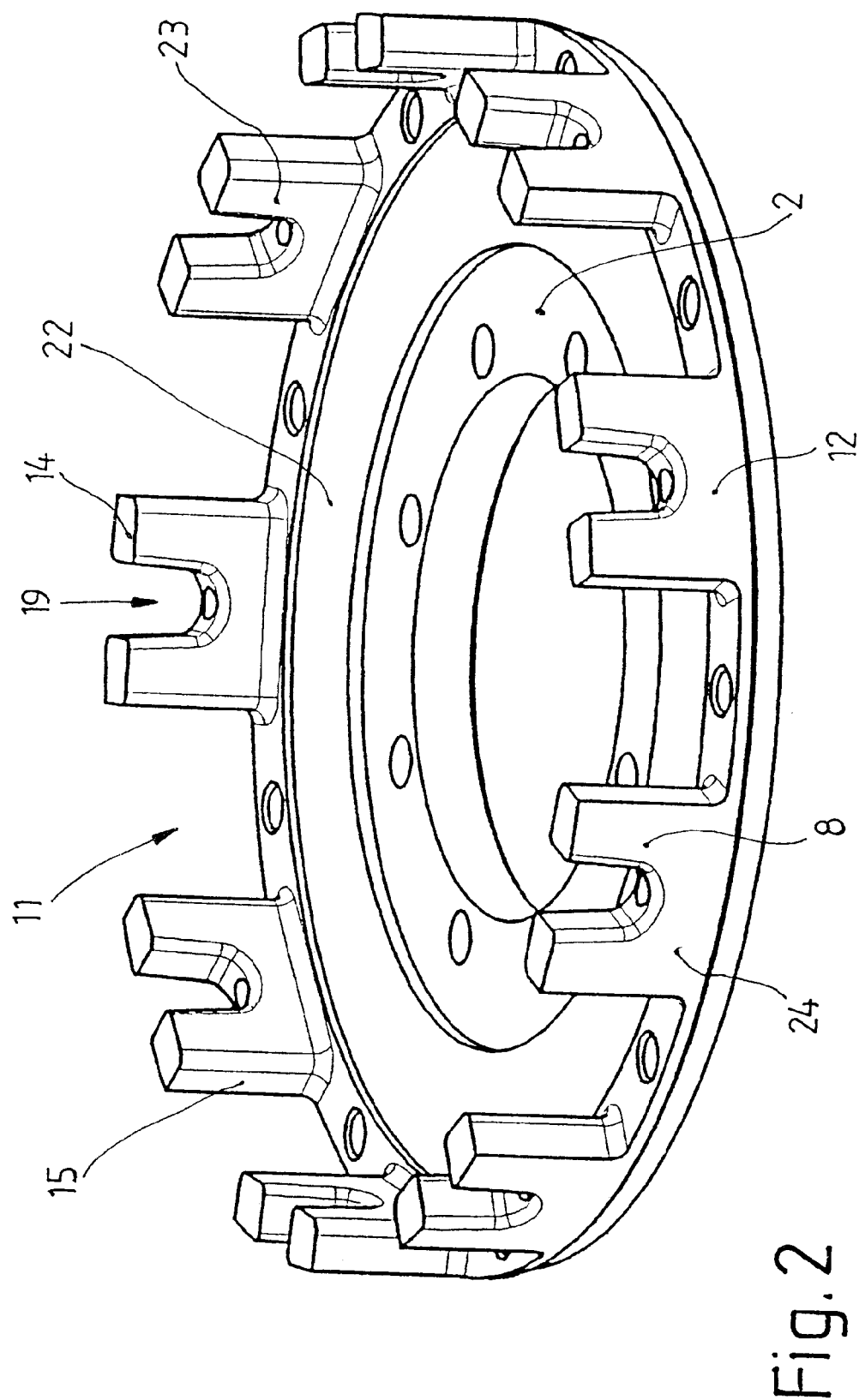
FIG. 2 shows a similar view of an input part.

In the case of the input part 2 shown in FIG. 2, nine axially oriented walls 8, distributed around the circumference, point in the axial direction; their guide surfaces 15 form the boundaries of openings 11, which cooperate with the radial projections 16, 17 on the pressure plate 5 and the intermediate disk 6. Here the openings 11 are arranged in such a way that a group of three openings spaced equally apart around the circle cooperates with the second radial projections 17 to provide guidance during the engagement and release processes, and a group of six openings 11 are provided to accept the first radial projections 16 for the transmission of torque. In this case, the latter openings 11 are arranged in such a way that they are grouped in pairs between the openings 11 provided for the second radial projections 17. The axially oriented walls 8 continue at their bases as a circumferential, ring-like elevation. This ring-like elevation rises above the friction surface 22 but not to such an extent that it comes in contact with the radial projections 16, 17 in the engaged state of the clutch after the friction linings of the clutch disk have been worn down to the maximum allowable extent. A fillet forms the transition between the base of the axial section 24 and the ring-like elevation, whereas the attachment section 12 is formed by sidepieces 23, each of which has an end surface 14. Guide surfaces 15 facing in the circumferential direction are formed on these axial sections 24 to cooperate with the radial projections 16, 17 of the pressure plate 5 and the intermediate disk 6. The U-shaped notch or preload opening 19 is bounded by the two sidepieces 23 and the attachment section 12 of the axial section 24. The housing 3 rests against the end surfaces 14, and the fastening means 10 extend through the notch 19 and into the attachment section 12.

Figure 4:
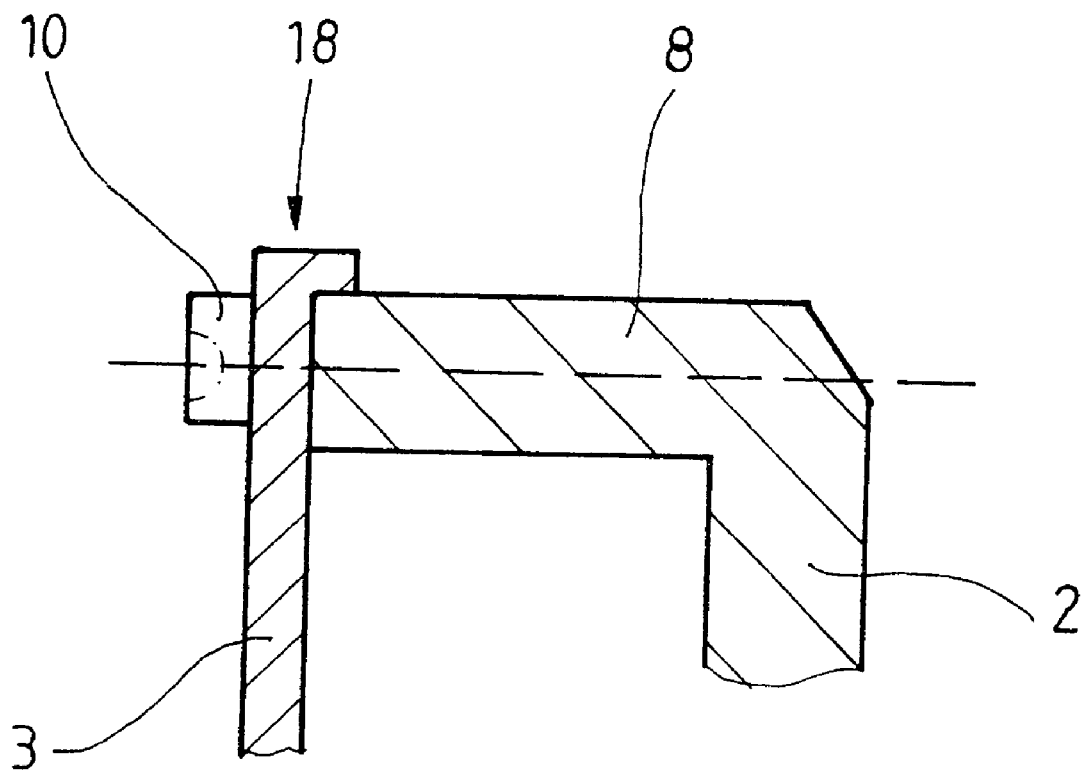
FIG. 4 shows a side view of part of the input part.

FIG. 4 is a partial view showing an alternative design for the area between the axial wall 8 and the housing 3. Here the input part 2 is designed as described on the basis of FIG. 2. There is a difference, however, with respect to the housing 3; the radially outer terminal area of the housing, i.e., the part which cooperates with the screw 10, now has a circumferential centering section 18, which grips around the radially outer area of the sidepieces 23. Although it serves primarily to improve the centering of the housing 3 relative to the input part 2 and their common axis of rotation, the centering section also makes it possible to reduce the centrifugal loads on the axial sections 24.

Figure 5:
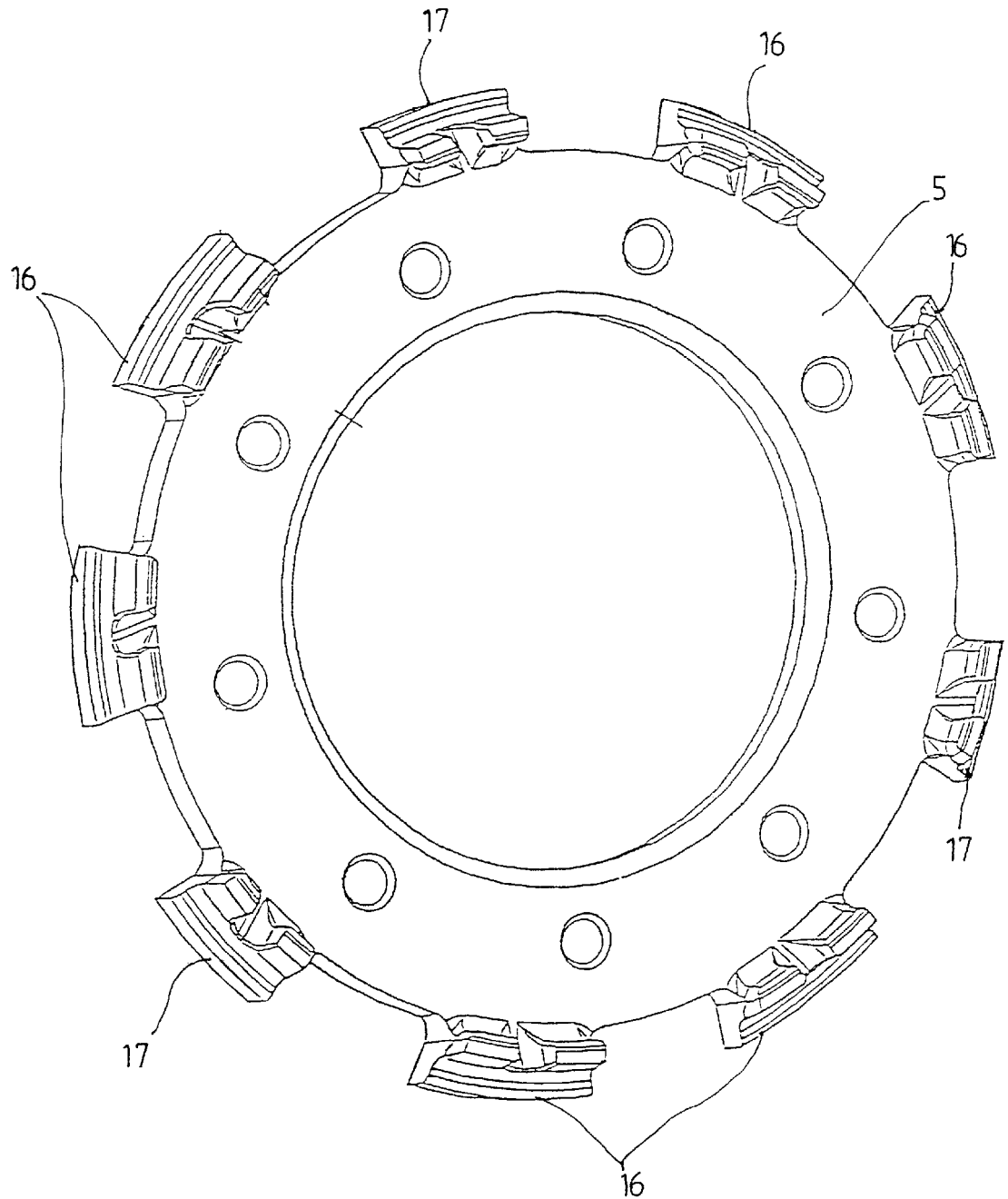
FIG. 5 shows a pressure plate in perspective.

FIG. 5 shows an exemplary embodiment of a pressure plate 5 with the first and second radial projections 16, 17, which have the axially oriented, elevated pressure plate knife edges 18, upon which the stored-energy element 21 acts. An intermediate disk 6 could have the same design as that of the pressure plate 5, except that it would not have the knife edges which the pressure plate does.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A friction clutch for use in the drive train of a motor vehicle, said friction clutch comprising
    an input part having a central axis and a radially outer part with a circumference and axially extending walls extending about at least part of said circumference,
    a clutch housing attached to the input part,
    a pressure plate between said housing and said input part, said pressure plate being movable axially with respect to said input part and having radial projections which are received between said walls to prevent rotation with respect to said input part,
    at least one clutch disc between said pressure plate and said input part, said clutch disc being effectively connected to a takeoff element, and
    a stored energy element urging said pressure plate toward said clutch disc, whereby torque is transmitted from input part to said takeoff element.

2. A friction clutch as in claim 1 wherein said walls are graduated in the circumferential direction.

3. A friction clutch as in claim 1 wherein said clutch housing is attached to said walls.

4. A friction clutch as in claim 3 wherein said housing is connected to said walls by fasteners.

5. A friction clutch as in claim 3 wherein said walls have axial end surfaces, said housing being supported on said axial end surfaces.

6. A friction clutch as in claim 5 wherein said walls have sections which are recessed from said end surfaces.

7. A friction clutch as in 6 wherein said recessed sections constitute attachment sections, said housing being connected to said walls by fasteners attached in said attachment sections.

8. A friction clutch as in claim 7 wherein said fasteners are under elastic load in an area between said end surfaces and said attachment section.

9. A friction clutch as in claim 7 wherein said area is formed in said walls.

10. A friction clutch as in claim 8 wherein said housing is elastically deformed over said attachment sections.

11. A friction clutch as in claim 1 wherein said axially extending walls have guide surfaces which face in a circumferential direction, said radial projections cooperating with said guide surfaces to guide said pressure plate axially during clutch engagement.

12. A friction clutch as in claim 11 wherein said friction clutch has first radial projections which transmit torque when said clutch is engaged and second radial projections which cooperate with said guide surfaces to guide said pressure plate axially during clutch engagement.

13. A friction clutch as in claim 11 further comprising at least one additional clutch disk and an intermediate disk.

14. A friction clutch as in claim 13 wherein said intermediate disc has first radial projections which transmit torque when said clutch is engaged and second radial projections which cooperate with said guide surfaces to guide said pressure plate axially during clutch engagement.

15. A friction clutch as in claim 1 wherein said housing has a circumferential flange which fits around said walls to center said housing with respect to said input section.

16. A friction clutch as in claim 1 wherein said walls are regularly spaced about said circumference.

17. A friction clutch as in 16 wherein each of said walls comprises a preload opening to reduce the centrifugal mass of the input part.

18. A friction clutch as in claim 17 wherein each of said walls has an axial end facing said housing, said preload opening comprising a notch in said axial end.

* * * * *